(12) United States Patent
Reed (10) Patent No.: US 12,408,644 B2
(45) Date of Patent: Sep. 9, 2025

(54) HOLLOW BODY FISHING LURE, HOOK AND ACCESSORY FOR THE SAME

(71) Applicant: Douglas M. Reed, Bridgeton, NJ (US)

(72) Inventor: Douglas M. Reed, Bridgeton, NJ (US)

( * ) Notice: Subject to any disclaimer, the term of this patent is extended or adjusted under 35 U.S.C. 154(b) by 84 days.

(21) Appl. No.: 18/412,322

(22) Filed: Jan. 12, 2024

(65) Prior Publication Data
US 2025/0228220 A1 Jul. 17, 2025

(51) Int. Cl.
*A01K 83/04* (2006.01)
*A01K 85/02* (2006.01)

(52) U.S. Cl.
CPC ............ *A01K 83/04* (2013.01); *A01K 85/024* (2022.02)

(58) Field of Classification Search
CPC ........ A01K 83/04; A01K 83/05; A01K 83/02; A01K 83/022; A01K 83/024; A01K 83/066; A01K 85/1831; A01K 85/1847; A01K 85/1851; A01K 85/021
See application file for complete search history.

(56) References Cited

U.S. PATENT DOCUMENTS

| | | | | |
|---|---|---|---|---|
| 823,319 A * | 6/1906 | Cooper | ............... | A01K 83/06 |
| | | | | 43/44.8 |
| 925,482 A * | 6/1909 | Kahlo | ............... | A01K 85/02 |
| | | | | 43/35 |
| 1,689,541 A * | 10/1928 | Welch | ............... | A01K 85/16 |
| | | | | 43/42.3 |
| 2,219,225 A * | 10/1940 | Gambill | ............... | A01K 85/10 |
| | | | | 43/42.4 |
| 2,549,458 A * | 4/1951 | Grimm | ............... | A01K 85/02 |
| | | | | 43/42.4 |
| 2,874,510 A * | 2/1959 | Fitzgerald | ............. | A01K 83/04 |
| | | | | 43/44.81 |
| 2,932,116 A | 4/1960 | Woodzick | | |
| 2,972,831 A * | 2/1961 | Anselmi | ................ | A01K 83/06 |
| | | | | 43/44.4 |
| 2,972,832 A * | 2/1961 | Anselmi | ................ | A01K 83/06 |
| | | | | 43/44.4 |
| 3,105,317 A * | 10/1963 | Fox | ................ | A01K 85/16 |
| | | | | 43/42.3 |

(Continued)

FOREIGN PATENT DOCUMENTS

WO  9858537 A1  12/1998

OTHER PUBLICATIONS

Catch All Tackle—Teaser Tail Bird website: https://catchalltackle.com/teaser-tail-bird/ Oct. 23, 2023.

(Continued)

*Primary Examiner* — Michael H Wang
(74) *Attorney, Agent, or Firm* — Patterson + Sheridan, LLP (57) ABSTRACT

Disclosed herein are fishing lures and replacement hook assembly kits for the same. In one example, a single hook assembly is provided that includes a single hook, and first and second stays. The single hook has a shank terminating at an eye, and a bend connecting the shank to a point. The bend and the shank both reside a reference plane. The first and second stays each have an elongated body. The elongated body of the first stay disposed on a first side of the reference plane and the elongated body of the second stay disposed on a first side of the reference plane. The elongated bodies have a resiliency sufficient to substantially return to an original position after deflecting the second end against the single hook.

21 Claims, 11 Drawing Sheets

(56) References Cited

U.S. PATENT DOCUMENTS

| | | | |
|---|---|---|---|
| 3,438,144 A | 4/1969 | Lincoln | |
| 3,783,549 A * | 1/1974 | Griggs | A01K 91/06 43/42.4 |
| 3,795,074 A | 3/1974 | Mantel | |
| 4,528,770 A | 7/1985 | McDiarmid | |
| 4,713,908 A * | 12/1987 | Corbitt, III | A01K 83/00 43/44.2 |
| 4,716,675 A * | 1/1988 | Knight | A01K 83/04 43/37 |
| 4,777,758 A * | 10/1988 | Phillips | A01K 85/02 43/43.2 |
| 4,862,630 A * | 9/1989 | Welch | A01K 85/16 43/42.26 |
| 5,105,575 A | 4/1992 | Robertaccio | |
| 6,032,400 A * | 3/2000 | Lau | A01K 85/00 43/42.26 |
| 6,505,432 B2 * | 1/2003 | Brinkman | A01K 83/06 43/44.8 |
| 6,634,135 B1 * | 10/2003 | Rydell | A01K 85/00 43/44.8 |
| 7,360,335 B2 | 4/2008 | Edwards | |
| 7,493,725 B2 * | 2/2009 | Sampson | A01K 85/16 43/42.3 |
| 7,694,453 B1 | 4/2010 | Arrico | |
| 10,531,649 B2 | 1/2020 | VanZant | |
| 2002/0112393 A1 * | 8/2002 | Bohn | A01K 85/02 43/43.6 |
| 2003/0074829 A1 * | 4/2003 | Brinkman | A01K 85/00 43/42.36 |
| 2005/0172537 A1 * | 8/2005 | Sampson | A01K 85/16 43/42.39 |
| 2019/0150415 A1 * | 5/2019 | Kovacs | A01K 85/1877 |
| 2022/0295768 A1 * | 9/2022 | Embry | A01K 85/1877 |

OTHER PUBLICATIONS

Bass Pro Shopps Sucker Hooks—Cabela's https://www.cabelas.com/shop/en/bass-pro-shops-sucker-hooks, Oct. 24, 2023.

Black Peter Slap Happy Daisy Chain Teaser—Fisihing Station—https://www.fishingstation.com.au/products/black-pete-slap-happy-daisy-chain-teaser—Oct. 23, 2023.

Fly Tying Tutorial: EP Crab—blog.fishwest.com—https://blog.fishwest.com/fly-tying-tutorial-ep-crab—by Fishwest Admin, Published Dec. 11, 2017.

* cited by examiner

HOLLOW BODY FISHING LURE, HOOK AND ACCESSORY FOR THE SAME

BACKGROUND

Field

Embodiments of the present disclosure generally relate to fishing lures, and more particularly, to a hollow body fishing lure, and replacement hook and accessory for the same

Description of the Related Art

Artificial fishing lures may be presented in many different ways, often depending on the target species, water temperature, and structure to which the fish are holding. One popular type of artificial fishing lure is a hollow body top water lure. These hollow body fishing lures are commonly used to imitate a frog, but also come in designs that imitate ducks, birds, rats, mice, and other animals or amphibians that swim on top of the water. Common to generally all of these hollow body fishing lures is a weedless design that features a double hook. The points of the double hook are shielded by the sides of the hollow body, allowing the lure to be used in brush, lily pads and other grassy areas with fouling. When the hollow body is struck (i.e., bitten) by a fish, the hollow body collapses to expose the points of the double hook.

Figure 1:
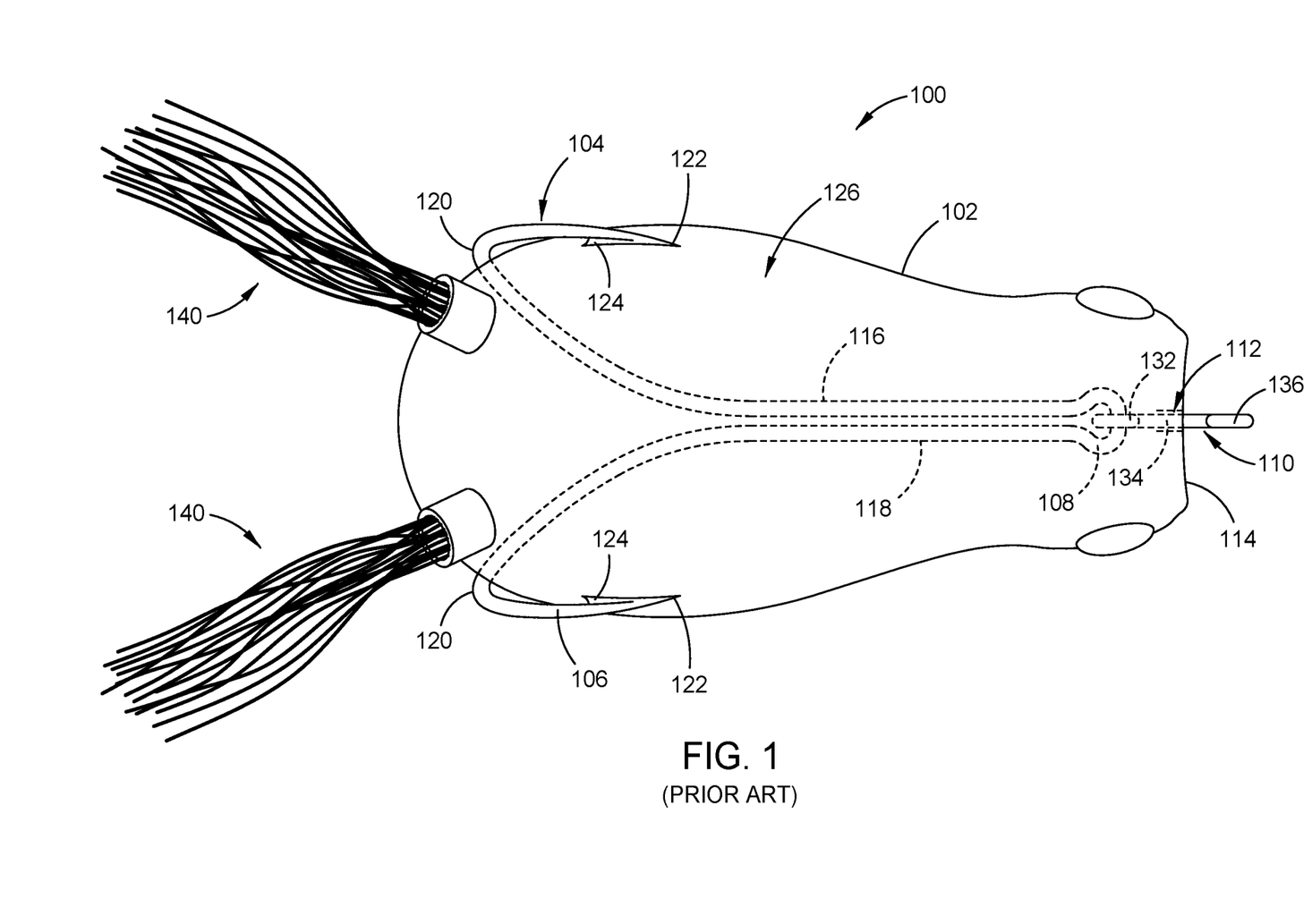
FIG. 1 is a schematic top view of a conventional hollow body fishing lure.
Figure 2:
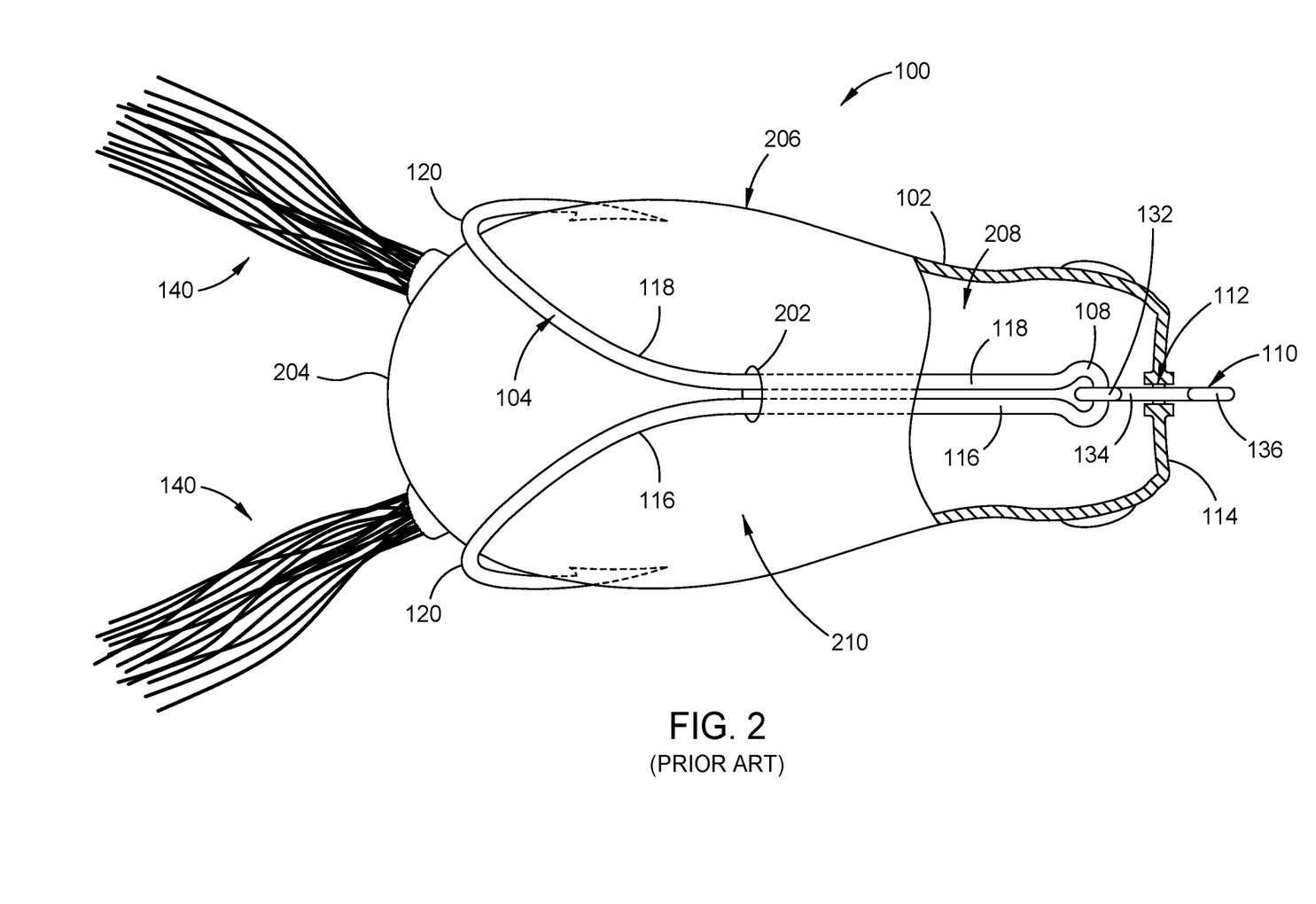
FIG. 2 is a schematic bottom view of the conventional hollow body fishing lure illustrated in FIG. 1.
Figure 3:
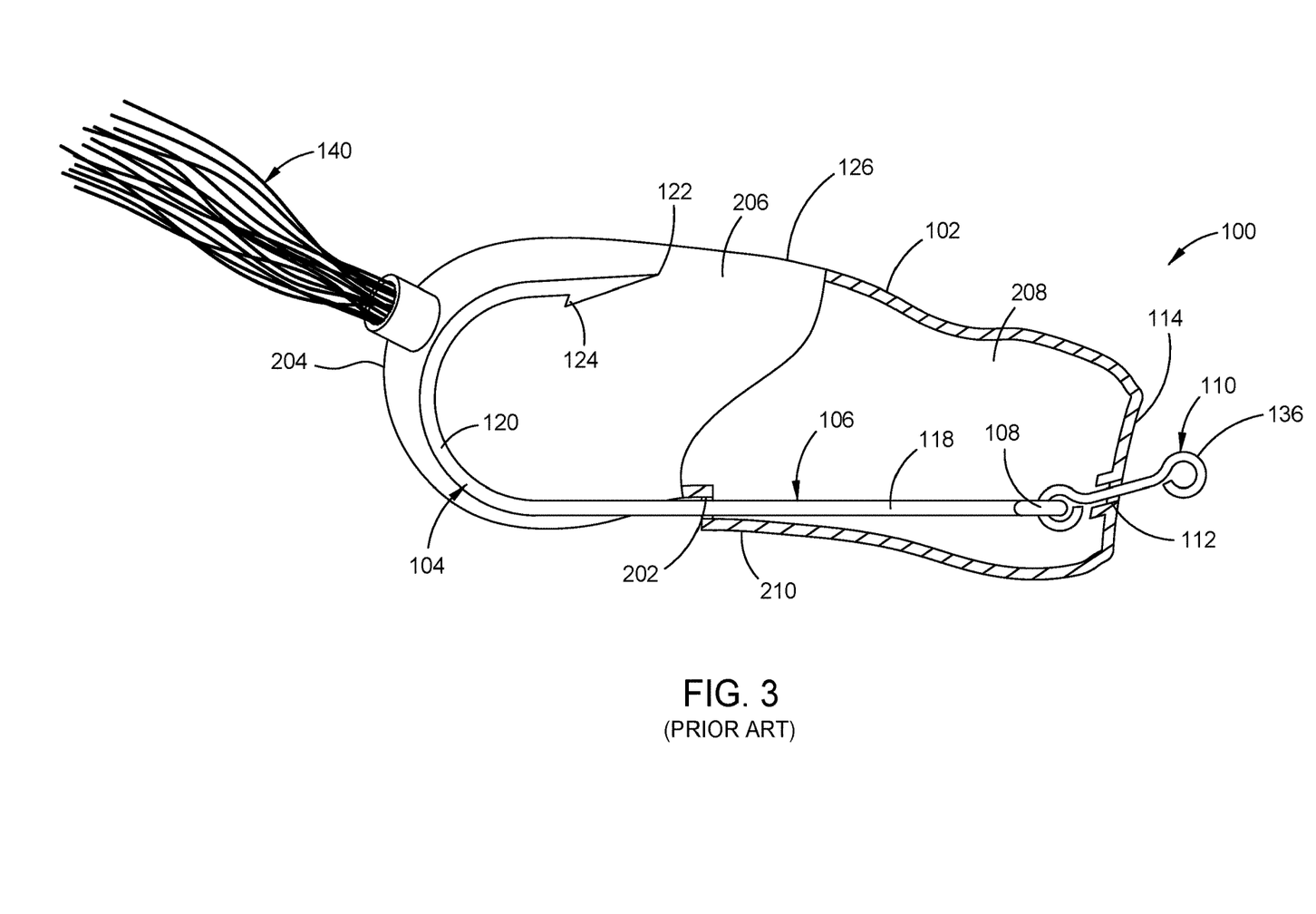
FIG. 3 is a schematic cutaway side view of the conventional hollow body fishing lure illustrated in FIG. 1.

FIGS. 1 and 2 depict schematic top and bottom views of one example of a conventional hollow body fishing lure 100. FIG. 3 is a schematic cutaway side view of the conventional hollow body fishing lure 100 illustrated in FIGS. 1 and 2. The hollow body fishing lure 100 includes a hollow body 102 having a double hook assembly 104. The hollow body fishing lure 100 may also include one or more appendages 140. The appendages 140 may be configured to imitate feet, legs, tails and the like. In FIG. 1, two appendages 140 are shown in the form of tassels.

The hollow body 102 is generally fabricated from a flexible resilient material, such as silicone, or other soft plastic. The hollow body 102 generally can collapse with when bitten by a fish, then return to its original form once the force from the bite is removed. The hollow body 102 may be configured to imitate a frog, a duck, a bird, a rat, a mouse, a rodent, a spider, snake, salamander, lizard, or other animal, insect or amphibian, without limitation.

The double hook assembly 104 is inserted through the hollow body 102. The double hook assembly 104 includes a double hook 106 having an eye 108 connected with a back eye 132 of a spacer 110. A link 134 of the spacer 110 extends from the back eye 132 and passes through an aperture 112 formed in the front 114 of the hollow body 102, terminating at a front eye 136. The front eye 136 is used to attach fishing line (not shown) to the lure 100. As the front and back eyes 132, 136 of the spacer 110 are generally larger than the diameter of the aperture 112, the spacer 110 keeps the double hook 106 from moving fore and aft within the hollow body 102. The eye 108 of the double hook 106 is formed at the ends of two shanks 116, 118. Each shank 116, 118 extends from the eye 108 to a bend 120 that terminates at a point 122 just after a barb 124. The bend 120 generally turns upward such that the points 122 of the double hook 106 are positioned proximate a top 126 of the hollow body 102.

As more clearly illustrated in FIGS. 2 and 3, the two shanks 116, 118 pass from an interior volume 208 through an aperture 202 formed through the bottom 210 near the back 204 of the hollow body 102 such that the point 122 connected to the first shank 116 is disposed on one side of an exterior 206 of the hollow body 102 while other the point 122 connected to the second shank 118 is disposed on the opposite exterior side of the hollow body 102.

Figure 4:
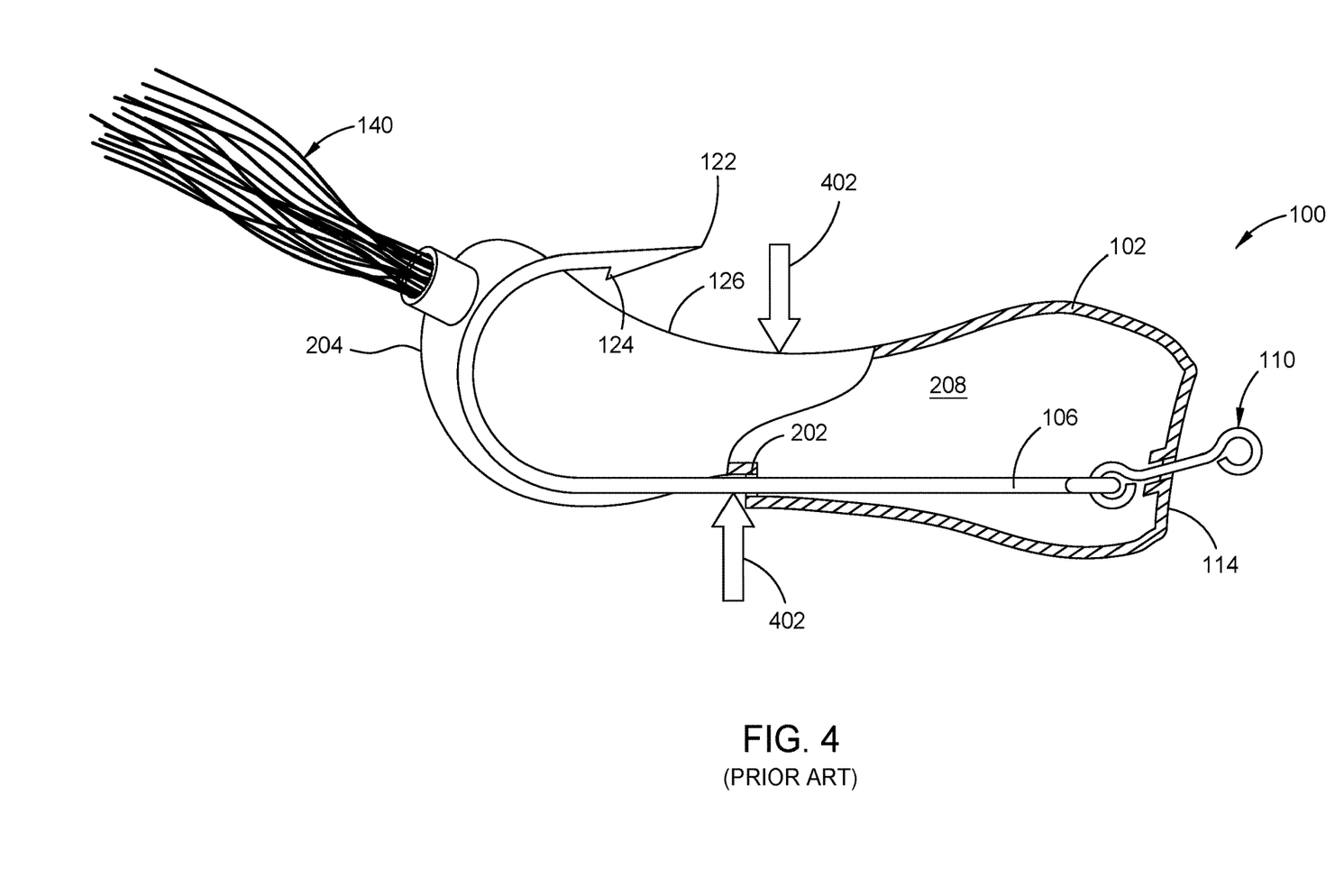
FIG. 4 is a schematic side view of the conventional hollow body fishing lure illustrated in FIG. 1 with the body being deformed, for example, by a fish strike.

The soft hollow body 102 easily collapses when bitten a striking fish (shown by arrows 402 in FIG. 4), exposing the points 122 of the double hook 106 which can be driven into the fish's mouth, as shown in FIG. 4. Although the double hook design of the lure 100 has good weedless functionality, the two points 122 of the double hook 106 requires double the amount of force to drive the points 122 into a fish's mouth as compared to other types of lures that use a single hook. As such, lures having double hooks generally have lower hook up ratios as compared to single hook lures.

Therefore, a need exists for an improved hollow body fishing lure.

SUMMARY

Embodiments of the present disclosure generally relate to a hollow body fishing lure, and replacement hook and accessory for the same. The hollow body fishing lure may be configured to imitate a frog, a duck, a bird, a rat, a mouse, a rodent, a spider, snake, salamander, lizard, or other animal, insect, amphibian, or other top water creature eaten by fish.

In one example, a single hook assembly is provided that includes a single hook, and first and second stays. The single hook has a shank terminating at an eye, and a bend connecting the shank to a point. The bend and the shank both reside a reference plane. The first and second stays each have an elongated body. The elongated body of the first stay disposed on a first side of the reference plane and the elongated body of the second stay disposed on a first side of the reference plane. The elongated bodies have a resiliency sufficient to substantially return to an original position after deflecting the second end against the single hook.

In some examples, the first stay and the second stay are symmetrical relative to the first reference plane.

In some examples, the first stay and the second stay are sufficiently rigid to support the first reference plane of the single hook assembly in a substantially vertical orientation when the first and second stays are placed on a horizontal surface with the point disposed over the shank of the single hook.

In some examples, the second ends of the first and second stays do not extend beyond a total length of the single hook when deflected against the single hook. In other examples, the second ends of the first and second stays do extend past a barb of the single hook when deflected against the single hook. In still other examples, the second ends of the first and second stays do not overlap the bend of the single hook when deflected against the single hook.

In some examples, the single hook has a size from 1/0 to 6/0.

In yet another example, a single hook assembly provided that includes provided that includes a single hook, a spacer, and first and second stays. The single hook has a shank terminating at an eye, and a bend connecting the shank to a point. The bend and the shank both reside a reference plane. The single hook has a size from 2/0 to 6/0. The spacer has a first eye and a second eye connected by a link. The first eye is connected to the eye of the hook. The first stay haves an elongated body. The elongated body has a first end connected to the single hook and a second end extending away from the elongated body towards the bend of the single hook. The elongated body is disposed on a first side of the first reference plane and has a resiliency sufficient to substantially return to an original position after deflecting the second end against the single hook. The second stay also has an elongated body. The elongated body of the second stay has a first end connected to the single hook and a second end extending away from the elongated body towards the bend of the single hook. The elongated body of the second stay is disposed on a second side of the first reference plane. The elongated body of the second stay has a resiliency sufficient to substantially return to an original position of the elongated body of the second stay after deflecting the second end of the second stay against the single hook. The first stay and the second stay are symmetrical relative to the first reference plane. The second ends of the first and second stays do extend past a barb of the single hook when deflected against the single hook. The first stay and the second stay are also sufficiently rigid to support the first reference plane of the single hook assembly in a substantially vertical orientation when the first and second stays are placed on a horizontal surface with the point disposed over the shaft of the single hook.

In some examples, the first and second stays are fabricated from a polymer, and each of the first and second stays have a sectional area great than or equal to a sectional area of the shank.

In yet another example, a hollow body fishing lure hook replacement kit is provided. The kit includes a single hook assembly disposed in a packaging container. The single hook assembly includes stays as described herein.

In some examples, the hollow body fishing lure hook replacement kit also includes an adhesive backed weed guard disposed in the container. The adhesive backed weed guard includes a plurality of projections extending a distance from a first side of a pad. The distance is at least half a diameter of the shank and less than 2.5 times the diameter of the shank. The adhesive backed weed guard also including an adhesive disposed on a second side of the pad and a peel-away backing disposed over the adhesive.

In some examples, the each of the plurality of projections of the adhesive backed weed guard further includes a proximal end coupled to a distal end by an elongated shaft. The proximal end is coupled to the pad. The distal end has a cap that overhangs the shaft. The cap may optionally have a sectional area greater than a sectional area of the shaft of the projection In yet another example, a hollow body fishing lure is provided. The hollow body fishing lure includes a hollow body, a hook, and a weed guard. The hollow body has a first aperture formed through a front end of the hollow body and a second aperture formed through a back end or bottom of the hollow body. The hook is disposed though the second aperture such that a point of the hook is disposed on an exterior of the hollow body and a shank of the hook is disposed within an interior of the hollow body. The weed guard is disposed on the exterior of the hollow body. The weed guard includes a plurality of projections receiving the point of the hook therebetween and extending a distance beyond the point when the hollow body is in a non-deformed state. The hollow body is sufficiently flexible to allow the weed guard to move clear of the point of the hook when the hollow body deformed in a direction away from the point of the hook and sufficiently resilient to return to the non-deformed state in which the point of the hook is disposed between the projections of the weed guard.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 5 is a top view of one example of a single hook assembly that may be used as a replacement to a conventional double hook assembly of a conventional hollow body fishing lure illustrated in FIGS. 1-3, or in a hollow body fishing lure illustrated in FIG. 7 and the like.

FIG. 15 is a side view of another example of a single hook assembly that may be used as a replacement to a conventional double hook assembly of a conventional hollow body fishing lure illustrated in FIGS. 1-3, or in a hollow body fishing lure illustrated in FIG. 7 and the like.

To facilitate understanding, identical reference numerals have been used, where possible, to designate identical elements that are common to the figures. It is contemplated that elements disclosed in one embodiment may be beneficially utilized in other embodiments without specific recitation.

DETAILED DESCRIPTION

Disclosed herein are fishing lures and replacement single hook assemblies for the same. The single hook assembly described herein utilizes a single hook for improved hook sets as compared to traditional double hook designs. For example, the single hook assembly is advantageously configured to allow the single hook assembly to replace double hook assemblies commonly utilized in convention hollow body fishing lures, such as but not limited to the hollow body fishing lure described above with reference to FIGS. 1-4.

The single hook assembly utilizes flexible stays that maintain a desired orientation of the hook, while also enabling the hook assembly to pass through apertures formed in the hollow body that allows the shank of the hook to exit the interior of the hollow body. The single hook assembly may also be packaged as a kit that optionally includes an adhesive backed weed guard. The adhesive backed weed guard enables a hollow body fishing lure originally designed for use with a double hook to maintain its weedless properties once the double hook is replaced with a single hook.

Figure 5:
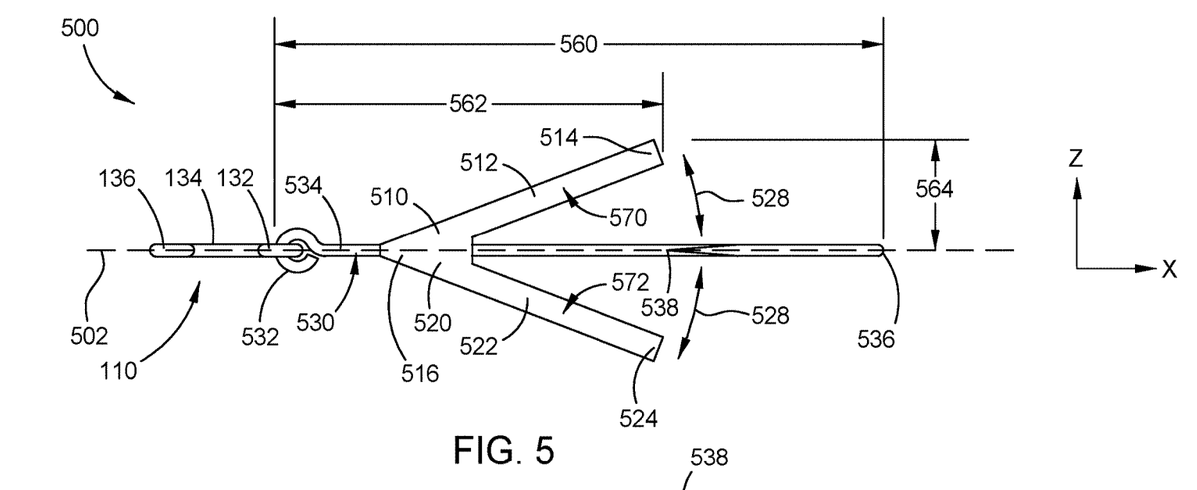
Figure 6:
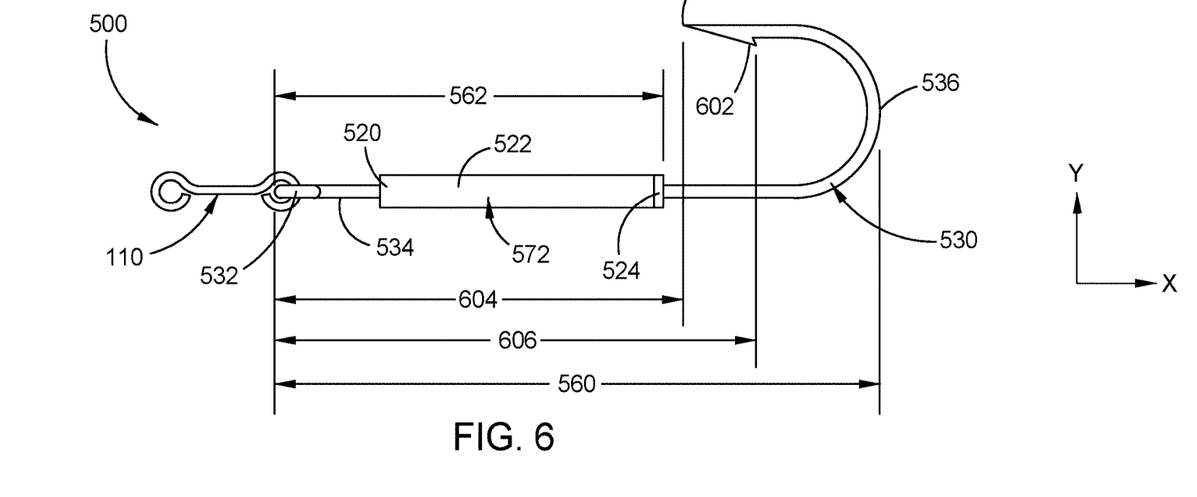
FIG. 6 is a side view of the single hook assembly.

FIGS. 5 and 6 are top and side views of one example of a single hook assembly 500 that may be used as a replacement to a conventional double hook assembly of a conventional hollow body fishing lure, such as but not limited to the conventional double hook assembly 104 of a conventional hollow body fishing lure 100 illustrated in FIGS. 1-4, among others. The single hook assembly 500 may also be used as original equipment in other lures.

The single hook assembly 500 includes a single hook 506 and at least two stays, shown in FIG. 5 as a first stay 570 and a second stay 572. The single hook assembly 500 may also include an optional spacer 110. The single hook 506 includes an eye 532, a shank 534, a bend 536 and a point 538. A barb 602 is located proximate the point 538. The eye 532 and bend 536 are disposed at opposite ends of the shank 534. The hook 506 has a length 560 defined between the farthest portions of the eye 532 and the bend 536, as illustrated in FIGS. 5 and 6. The bend 536 and shank 534 reside in a first reference plane 502. The first reference plane 502 is generally in the X/Y plane.

The first and second stays 570, 572 of single hook assembly 500 are disposed on opposite sides of the first reference plane 502. The first and second stays 570, 572 may be arranged as an arrow pointing towards the eye 532 of the hook 530. The first stay 570 includes an elongated body 512 having a first end 510 and second end 514. The first end 510 is coupled to the shank 534 of the hook 530 near the eye 532. The elongated body 512 extends from the first end 510 away from the eye 532 towards the bend 536 of the hook 530 to the second end 514. The elongated body 512 also extends from the first end 510 away from the shank 534 of the hook 530 to the second end 514. The second end 514 of the elongated body 512 is spaced a distance 564 in the Z direction away from the shank 534 of the hook 530 to the second end 514. The distance 564 may be, but is not limited to, ⅜ to about 1.0 inches.

The similar to the first stay 570, the second stay 572 includes an elongated body 522 having a first end 520 and second end 524. The first end 520 is coupled to the shank 534 of the hook 530 near the eye 532. The elongated body 522 extends from the first end 520 away from the eye 532 towards the bend 536 of the hook 530 to the second end 524. The elongated body 522 also extends from the first end 520 away from the shank 534 of the hook 530 to the second end 524. The second end 524 of the elongated body 522 is spaced a distance 564 in the Z direction away from the shank 534 of the hook 530 to the second end 524. The distance 564 may be, but is not limited to, ⅜ to about 1.0 inches.

The first ends 510, 520 of the first and second stays 570, 572 may be coupled to a common base 516. The base 516, when used, provides a common attachment point for the first and second stays 570, 572 to the shank 534 of the hook 530. In one example, the base 516 and the stays 570, 572 are formed from a contiguous mass of material. For example, the base 516 and the stays 570, 572 may be overmolded, 3-D printed, snapped-on, adhered or otherwise affixed to the shank 534 as a single one piece element. In other examples, the base 516 and the stays 570, 572 may be two or more separate piece elements. Additionally, the stays 570, 572 may be separately or jointly connected to the shank 534 of the hook 530 without a common base 516.

As discussed above, the elongated body 512 of the first stay 570 and the elongated body 522 of the second stay 572 are disposed on opposite sides of the first reference plane 502. The elongated body 512 of the first stay 570 and the elongated body 522 of the second stay 572 may be disposed in an orientation that is symmetrical relative to the reference plane 502 and relative to the shank 534. In one example, the elongated body 512 of the first stay 570 and the elongated body 522 of the second stay 572 are disposed in a second reference plane (not illustrated) that has an orientation perpendicular to the reference plane 502. The second reference plane (i.e., the X/Z plane in FIGS. 5 and 6) includes the shank 534. In other example, the second ends 514, 524 of the first and second stays 570, 572 are symmetrically disposed below the second reference plane (i.e., on the opposite side the shank 534 relative to the point 538 of the hook 530).

The elongated bodies 512, 522 are also sized to allow the hook 530 and stays 570, 572 to pass through the aperture 202 of the hollow body 102 (as later shown in FIG. 8). For example, the end 514, 524 of each elongated body 512, 522 is generally disposed at a distance 562 from a front of the eye 532 of the hook 530. The distance 562 is shorter than the length 560 of the hook 530 to ensure the stays 570, 572 can pass completely through the aperture 202 and completely into the interior volume 208 of the hollow body 102. In other examples, the distance 562 is shorter a distance 604 defined between the front of the eye 532 of the hook 530 and the point 538 of the hook 530. In other examples, the distance 562 is shorter a distance 606 defined between the front of the eye 532 of the hook 530 and the barb 602 of the hook 530.

The elongated bodies 512, 522 of the first and second stays 570, 572 are formed from a resilient material, such as spring steel, stainless steel, or resilient polymer. The resilient material of the elongated bodies 512, 522 allow the second ends 514, 524 of the bodies 512, 522 to be defected against the shank 534, then return substantially to its original position, that is, to at least 90% of its original position, when in a new unused condition.

The material of the elongated bodies 512, 522 of the first and second stays 570, 572 is also sufficiently rigid enough to support the bend 536 of the single hook 530 in a substantially vertical orientation (i.e., the first reference plane 502 is disposed in the X/Y plane) when the first and second stays 570, 572 are placed on a horizontal surface (i.e., the X/Z plane) with the point 538 disposed over the shank 534 of the single hook 530.

The rigidity and resiliency of the material of the elongated bodies 512, 522 of the first and second stays 570, 572 are generally selected to allow the stays 570, 572 to flex and pass through the aperture 202 of the hollow body 102, then to spring outwards once the second ends 514, 524 of the elongated bodies 512, 522 are completely within the interior volume 208 of the hollow body 102. Once within the hollow body 102, the spread orientation of first and second stays 570, 572 against the sides and bottom walls of the hollow body 102 supports the hook 530 in an upright position (i.e., in the X/Y plane) which promotes hook penetration when a fish strikes the lure by maintaining the point 538 of the hook 530 clear of the body 102.

Figure 7:
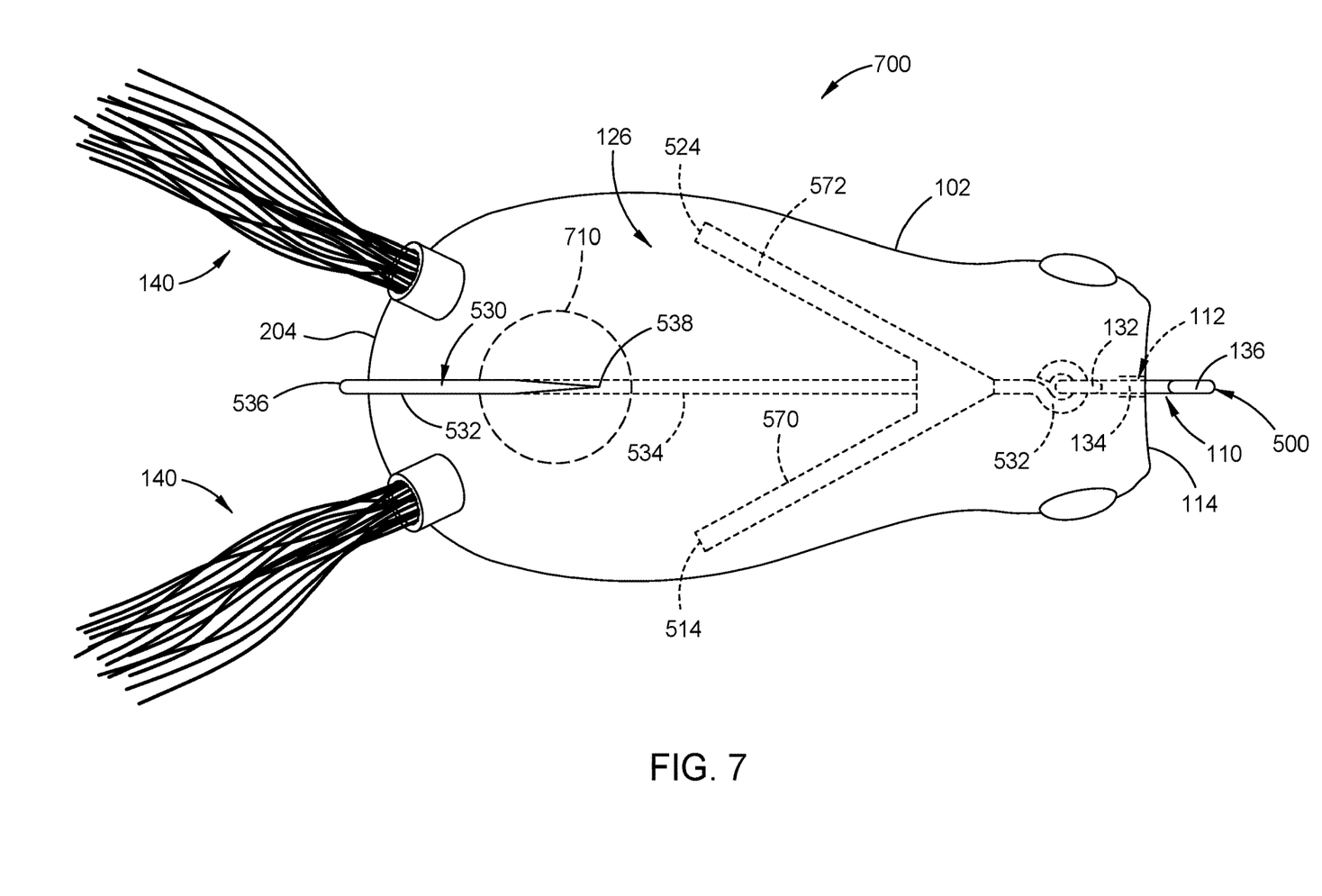
FIG. 7 is a schematic top view of a hollow body fishing lure having a single hook assembly.
Figure 8:
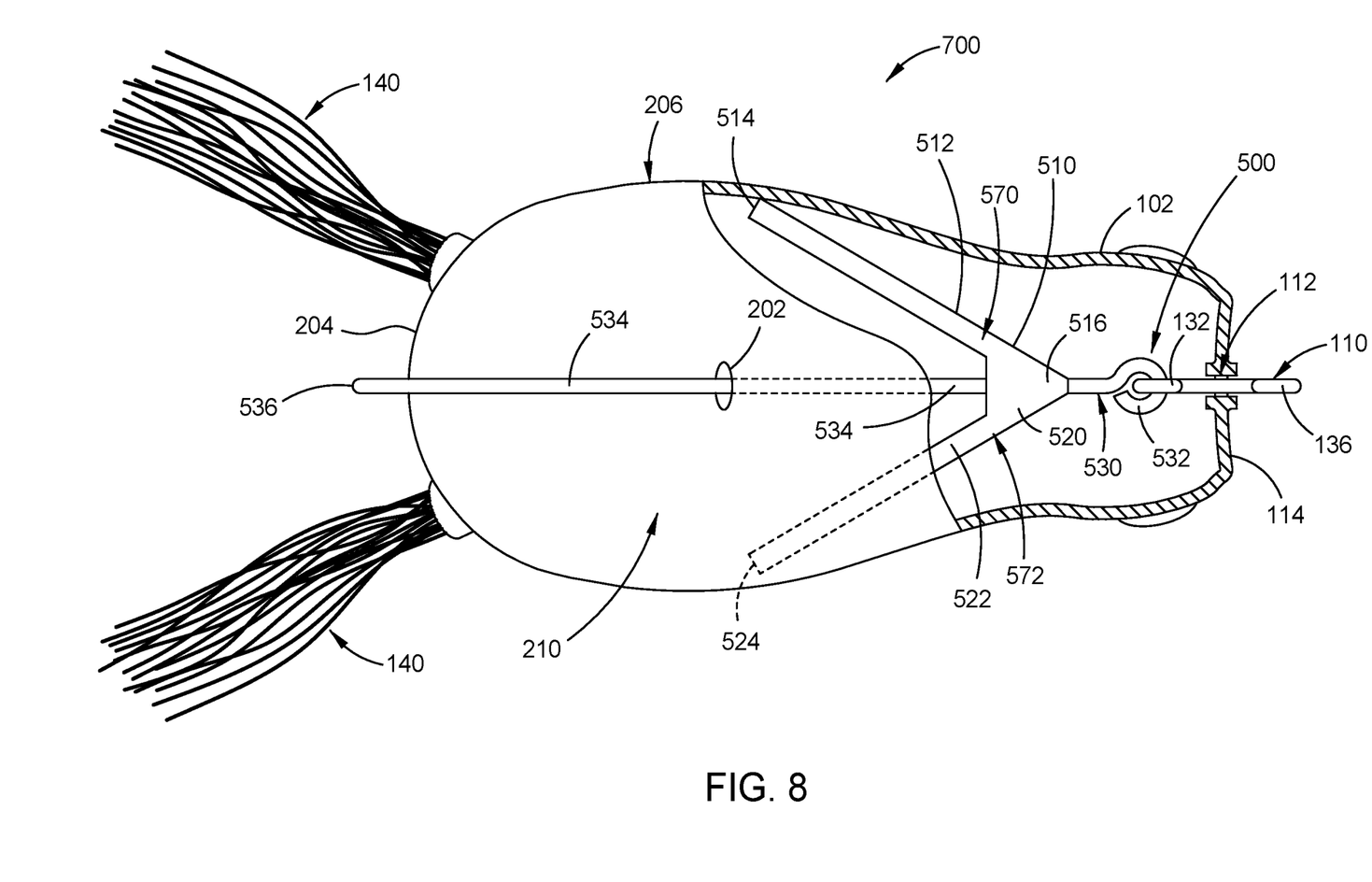
FIG. 8 is a schematic bottom view of the hollow body fishing lure illustrated in FIG. 7.
Figure 9:
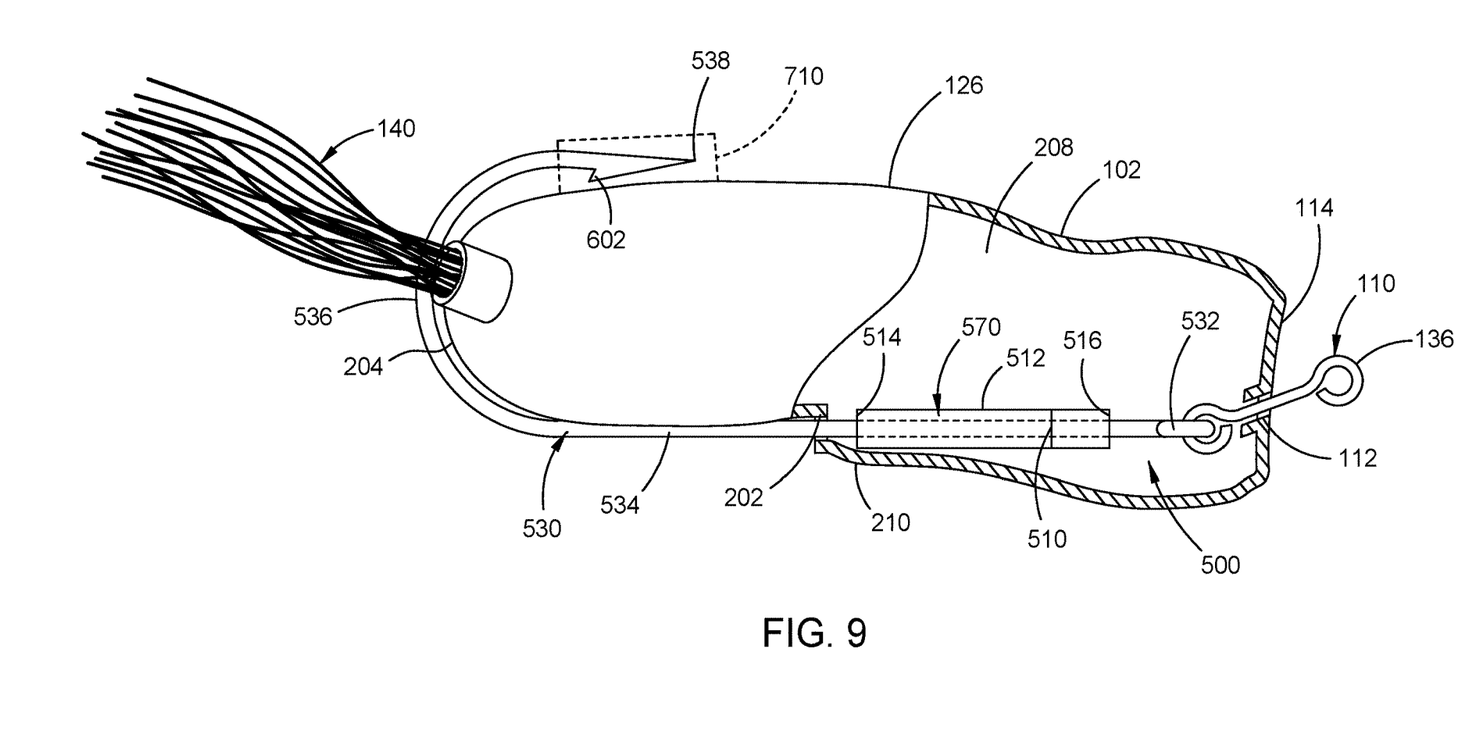
FIG. 9 is a schematic sectional side view of the hollow body fishing lure illustrated in FIG. 7.

FIGS. 7, 8 and 9 depict the single hook assembly 500 disposed within one example of a hollow body fishing lure 700. The hollow body fishing lure 700 includes a hollow body 102 as described above. In one example, the hollow body fishing lure 100 may be converted to the hollow body fishing lure 700 by replacing the double hook assembly 104 of the hollow body fishing lure 100 with the single hook assembly 500. In other examples, the hollow body fishing lure 700 may be manufactured with the single hook assembly 500 as original equipment (e.g., the original hook).

The hollow body 102 is configured as described above with reference to FIGS. 1, 2 and 3. The hollow body 102 may be configured to imitate a frog, a duck, a bird, a rat, a mouse, a rodent, a spider, snake, salamander, lizard, or other animal, insect, amphibian, or other top water creature commonly eaten by fish.

Turning first to the top view of the hollow body fishing lure 700 depicted in FIG. 7, the single hook assembly 500 is illustrated disposed within the hollow body 102 with the shank 534 of the single hook 530 passing through the aperture 202. The point 538 of the single hook 530 is disposed over the top 126 of the hollow body 102. The stays 570, 572 extending symmetrically from each side of the shank 534 support the point 538 of the single hook 530 aligned in the center of the hollow body fishing lure 700. The stays 570, 572 generally keep the point 538 of the single hook 530 from falling over to the side of the lure 700 where penetration into a fish upon a strike will not be as effective. Moreover, the stays 570, 572 keep the point 538 of the single hook 530 engaged with a weed guard 710 disposed on the top 126 of the hollow body 102.

Referring now to the bottom view of the hollow body fishing lure 700 depicted in FIG. 8 and the cutaway side view of the hollow body fishing lure 700 depicted in FIG. 9, the shank 534 of the single hook 530 passes through the aperture 202 such that the bend 536 and point 538 of the hook 530 are disposed on the exterior 206 of the hollow body 102 while the stays 570, 572 of the hook assembly 500 and eye 532 of the hook 530 are disposed within the interior volume 208 of the hollow body 102. The spacer 110 of the hook assembly 500 extends through the aperture 112 disposed in the front 114 of the hollow body 102 to limit the fore and aft movement of the hook 530 within the hollow body 102, which also beneficially maintains the point 538 of the hook 530 shielded by the weed guard 710, making the lure 700 "weedless" while the body 102 is in a non-deformed state.

As discussed above, the stays 570, 572 of the hook assembly 500 spring outward within the interior volume 208 of the hollow body 102 to maintain the hook 530 in an upright position. In one example, the stays 570, 572 of the hook assembly 500 contact the interior side of the bottom 210 of the hollow body 102. In one example, the stays 570, 572 of the hook assembly 500 contact the interior side of the sides of the hollow body 102. The stays 570, 572 advantageously keep the hook 530 from tipping over within the hollow body 102.

Figure 10:
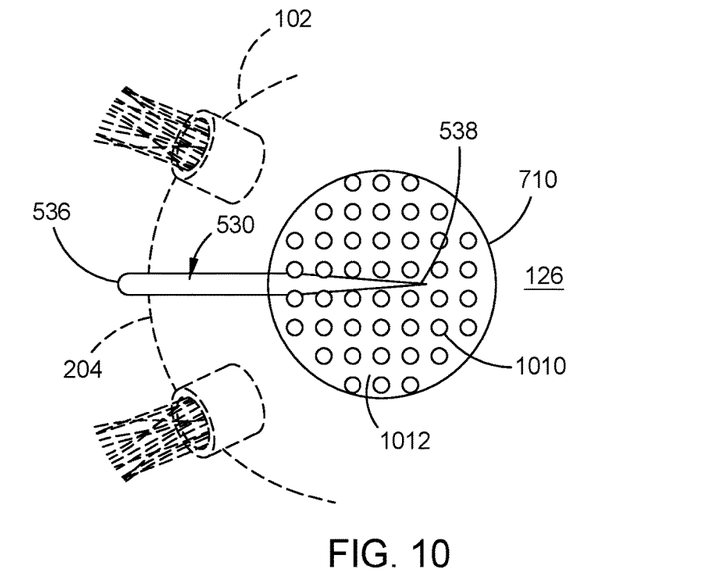
FIG. 10 is an enlarged partial top view of a portion of the hollow body fishing lure illustrated in FIG. 7 showing a point of the single hook disposed within an exemplary weed guard.

FIG. 10 is an enlarged partial top view of a portion of the hollow body fishing lure 700 illustrated in FIG. 7 showing the point 538 of the single hook 530 disposed within the exemplary weed guard 710. The weed guard 710 generally includes a plurality of projections 1010 extending from a pad 1012. The pad 1012 may have any desired shape, and in the example depicted in FIG. 10, the pad 1012 has a circular shape.

In one example, the plurality of projections 1010 are arranged in rows. The rows of projections 1010 are sufficiently spaced to allow the point 538 of the hook 530 to be received between the projections 1010. In some examples, the plurality of projections 1010 are arranged in rows and columns. Alternatively, the plurality of projections 1010 may be arranged differently. The plurality of projections 1010 are arranged across the pad 1012 such that at least two projections 1010 are disposed beyond the point 538 of the hook 530 to prevent weeds from fouling the hook 530.

Figure 11:
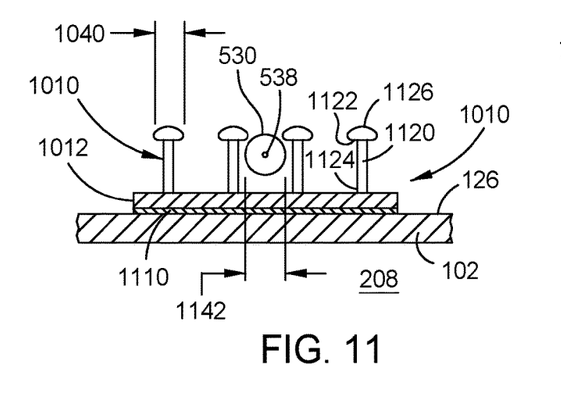
FIG. 11 is a sectional side view of a portion of the hollow body fishing lure illustrated in FIG. 7 showing the point of the single hook disposed within the weed guard.

FIG. 11 is a sectional side view of a portion of the hollow body fishing lure 700 illustrated in FIG. 7 showing the point 538 of the single hook 530 disposed within the projections 1010 of the weed guard 710. The projections 1010 of the weed guard 710 may be formed from a polymer or other suitable material. Each of projections 1010 includes a shaft 1120 having a proximal end 1124 and a distal end 1122. The distal end 1122 of the shaft 1120 may include an optional cap 1126. The cap 1126 has a sectional area larger than a sectional area of the shaft 1120, such that the cap 1126 overhangs the shaft 1120. In one example, the cap 1126 may be formed by melting the polymer material from which the projections 1010 were formed. At least two adjacent shafts 1120 have a pitch greater than a diameter 1142 of the hook 530 which allows the hook 530 to be disposed below the cap 1126 among the plurality of projections 1010. As the sectional area of the caps 1126 is greater than that of the area of the shafts 1120, the overhanging caps 1126 function to capture the point 538 of the hook 530 among the plurality of projections 1010 which enhances the weed guarding functionality of the weed guard 710.

Figure 12:
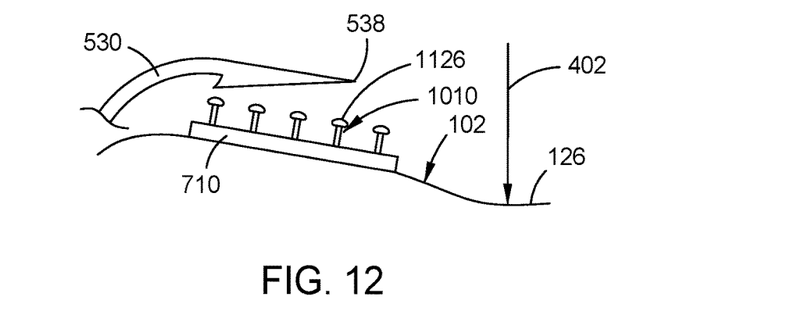
FIG. 12 is a sectional side view of a portion of the hollow body fishing lure illustrated in FIG. 7 showing the point of the single hook clear of the weed guard when the body is deformed, for example, by the strike of a fish.

Once a bite force (shown by arrow 402) is applied to the hollow body 102 as shown in FIG. 12, the hollow body 102 deforms, collapsing inward. As the hollow body 102 collapses inward, the top 126 of the hollow body 102 and the weed guard 710 disposed thereon move away from the point 538 of the single hook 530, leaving the point 538 exposed clear and above the projections 1010 of the weed guard 710 such that the point 538 of the single hook 530 can freely penetrate the striking fish.

Moreover, even with the hollow body 102 deformed and the point 538 of the single hook 530 free and clear of the weed guard 710, the stays 570, 572 continue to support the point 538 of the single hook 530 vertically relative to the hollow body 102 so that the point 538 of the single hook 530 does not rotate to a position where the hollow body 102 can shield the point 538, but rather the point 538 of the single hook 530 remains in a position clear of the weed guard 710 and the hollow body 102 such that the point 538 of the hook 530 can freely engage the striking fish without obstruction, resulting in higher hook up ratios.

Figure 13:
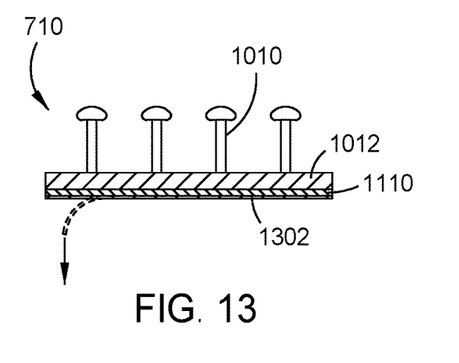
FIG. 13 is a sectional view of one example of a weed guard that may be utilized with a hollow body or other type of fishing lure.

FIG. 13 is a sectional view of one example of the weed guard 710 that may be utilized with a hollow body fishing lure or other type of fishing lure. The weed guard 710 is generally configured as described above with reference to FIGS. 10 and 11. The weed guard 710 prior to use includes a removable backing 1302 disposed over the adhesive 1110. The removable backing 1302 may be peeled away or otherwise removed to expose the adhesive 1110 when the weed guard 710 is ready to be attached to the top 136 of the hollow body 102 or other type of fishing lure.

Figure 14:
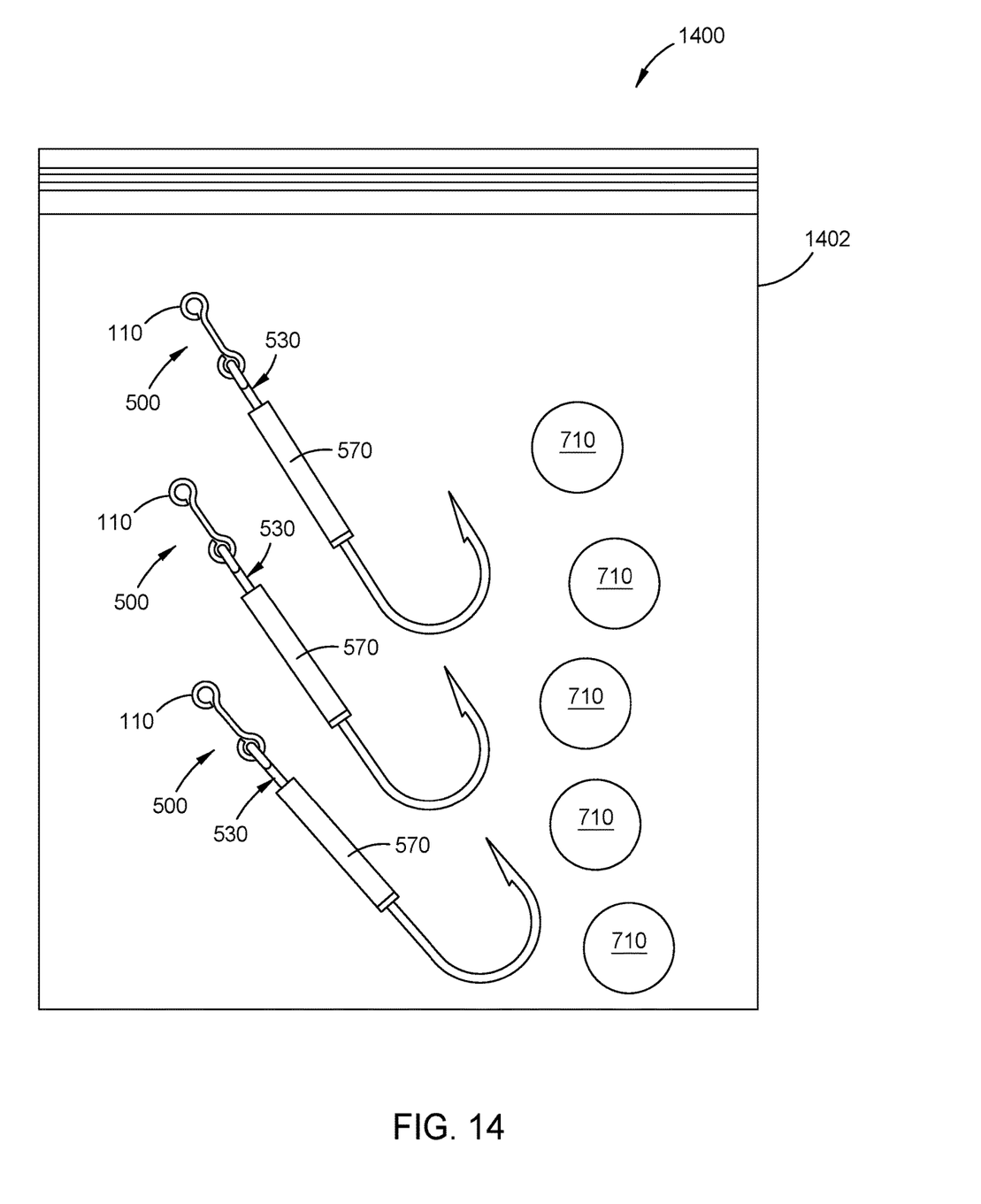
FIG. 14 is a single hook replacement kit that includes a single hook assembly and a weed guard.

FIG. 14 schematically illustrates a single hook replacement kit 1400 that includes one or more single hook assemblies 500, and optionally one or more weed guards 710, disposed in a packaging container 1402. In the example illustrated in FIG. 14, three single hook assemblies 500 and five optional weed guards 710 are disposed in the packaging container 1402 of the kit 1400. In other examples, the single hook replacement kit 1400 may include at least one to as many hook assemblies 500 that may fit within the packaging container 1402, and between zero to as many weed guards 710 that can be disposed in the packaging container 1402. The packaging container 1402 may be a polymer bag, a blister pack, a hinged plastic box, a cardboard box, a paper board box or other suitable container.

Figure 15:
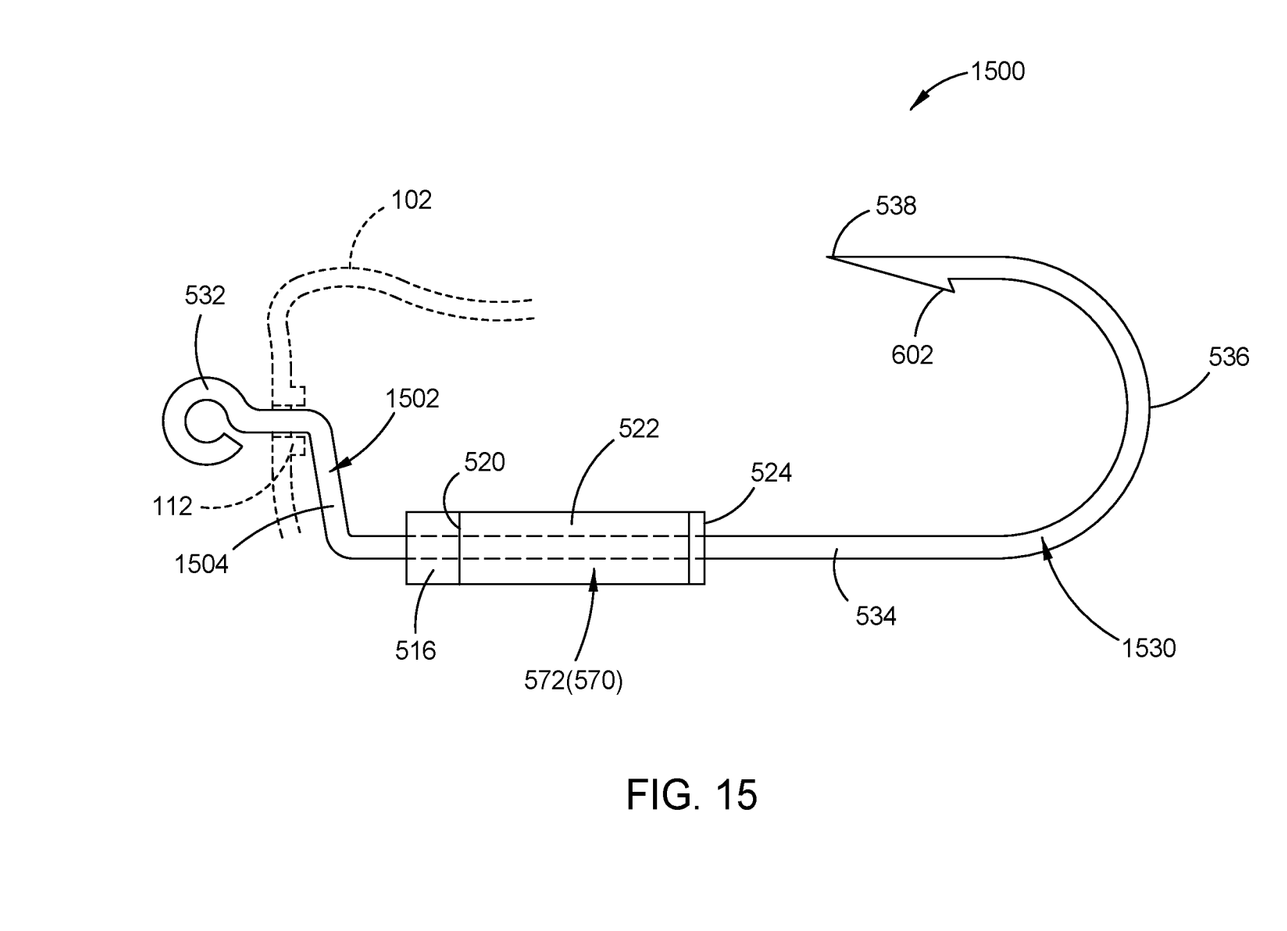

FIG. 15 is a side view of another example of a single hook assembly 1500 that may be used as a replacement to a conventional double hook assembly 104 of a conventional hollow body fishing lure 100 illustrated in FIGS. 1-3, or in a hollow body fishing lure 700 illustrated in FIG. 7, among others. The single hook assembly 1500 may also be used as an alternative to replace the single hook assembly 500 in the kit 1400.

The single hook assembly 1500 is generally the same as the hook assembly 500 except herein the single hook assembly 1500 does not utilize a spacer 110, but rather a single hook 1530 of the hook assembly 1500 has a stepped front portion 1502 disposed between the stays 570, 572 (only one stay is shown in the side view of FIG. 15, with the second stay being on the oppose side of the reference plan as described above). The other parts of the single hook 1530 are the same as the hook 530, including the stays 570, 572. The stays 570, 572 allow the hook 1530 to maintain an upright orientation within the hollow body 102 as described above with reference to the hook 530.

The stepped front portion 1502 includes a first portion 1504 and a second portion 1506. The first portion 1504 connects the second portion 1506 to the shank 534 of the hook 1530. The first portion 1504 generally extends at a 90 degree or greater angle from the shank 534 generally in the same but opposite direction as the bend 536, as shown in FIG. 15. The second portion 1506 connects the first portion 1504 to the eye 532 of the hook 1530. The second portion 1506 is substantially parallel to the shank 534 of the hook 1530, and a length sufficient to pass through the aperture 112 disposed in the front 114 of the hollow body 102 (shown in phantom), thus retaining the position of the hook 1530 within the hollow body 102.

Thus, a single hook assembly having stays that allow a hook to be maintained in an desirable orientation that promotes in provided hook up ratios has been disclosed above. The single hook assembly can be effortlessly installed through an aperture of the hollow body, easily replacing conventional double hook assemblies. An adhesive backed weed guard has also been disclosed that can be readily mounted on the exterior of a lure. The weed guard may optionally be included with the single hook assembly as part of a replacement kit. The single hook assembly may also be utilized as original equipment on lures seeking to improve penetration over double hook designs.

While the foregoing is directed to embodiments of the present disclosure, other and further embodiments of the disclosure may be devised without departing from the basic scope thereof, and the scope thereof is determined by the claims that follow.

What is claimed is:

1. A replaceable single hook assembly for replacing a hook in a hollow body fishing lure having a front hole and a rear hole, the replaceable single hook assembly consisting essentially of:
   a single hook having a shank terminating at an eye, a bend connecting the shank to a point, the bend and the shank both residing in a first reference plane, the shank having a sufficient length to extend through the front hole while the bend or the shank extends through the rear hole;
   a spacer having a first eye and a second eye connected by a link, the first eye connected to the eye of the hook
   a first stay having an elongated body, the elongated body having a first end connected to the single hook and a second end extending away from the shank towards the bend of the single hook, the elongated body disposed on a first side of the first reference plane, the elongated body having sufficient resiliency to substantially return to an original position of the elongated body within an interior cavity of the hollow body fishing lure after deflecting the second end against the single hook upon passing through the rear hole of the hollow body fishing lure; and
   a second stay having an elongated body, the elongated body of the second stay having a first end connected to the single hook and a second end extending away from the shank towards the bend of the single hook, the elongated body of the second stay disposed on a second side of the first reference plane, the elongated body of the second stay having sufficient resiliency to substantially return to an original position of the elongated body of the second stay within an interior cavity of the hollow body fishing lure after deflecting the second end of the second stay against the single hook upon passing through the rear hole of the hollow body fishing lure.

2. The replaceable single hook assembly of claim 1, wherein the first stay and the second stay are symmetrical relative to the first reference plane.

3. The replaceable single hook assembly of claim 2, wherein the first stay and the second stay form an arrow shape.

4. The replaceable single hook assembly of claim 1, wherein the first stay and the second stay are sufficiently rigid to support the first reference plane of the single hook assembly in a substantially vertical orientation when the first and second stays are placed on a horizontal surface with the point disposed over the shank of the single hook.

5. The replaceable single hook assembly of claim 4, wherein the first stay and the second stay have an orientation perpendicular to the first reference plane of the single hook assembly.

6. The replaceable single hook assembly of claim 4, wherein the second ends of the first and second stays are disposed on a side of a second reference plane that is opposite the point of the single hook, the second reference plane having an orientation perpendicular to the first reference plane, the shank residing in both the first and second reference planes.

7. The replaceable single hook assembly of claim 4, wherein the second ends of the first and second stays do not extend beyond a total length of the single hook when deflected against the single hook.

8. The replaceable single hook assembly of claim 4, wherein the second ends of the first and second stays do extend past a barb of the single hook when deflected against the single hook.

9. The replaceable single hook assembly of claim 4, wherein the second ends of the first and second stays do not overlap the bend of the single hook when deflected against the single hook.

10. The replaceable single hook assembly of claim 1, wherein the single hook has a size from 1/0 to 6/0.

11. A hollow body fishing lure hook replacement kit comprising:
   a packaging container; and
   the replaceable single hook assembly of claim 1 disposed in the packaging container.

12. The hollow body fishing lure hook replacement kit of claim 11 further comprising:
   an adhesive backed weed guard disposed in the container, the adhesive backed weed guard comprising:

a pad;
a plurality of projections extending a distance from a first side of the pad, the distance being at least half a diameter of the shank and less than 2.5 times the diameter of the shank;
an adhesive disposed on a second side of the pad; and
a peel-away backing disposed over the adhesive.

13. A replaceable single hook assembly, consisting essentially of:
a single hook having a shank terminating at an eye, a bend connecting the shank to a point, the bend and the shank both residing in a first reference plane, the single hook has a size from 2/0 to 6/0;
a spacer having a first eye and a second eye connected by a link, the first eye connected to the eye of the hook;
a first stay having an elongated body, the elongated body having a first end connected to the single hook and a second end extending away from the shank towards the bend of the single hook, the elongated body disposed on a first side of the first reference plane, the elongated body having sufficient resiliency to substantially return to an original position of the elongated body after deflecting the second end against the single hook; and
a second stay having an elongated body, the elongated body of the second stay having a first end connected to the single hook and a second end extending away from the shank towards the bend of the single hook, the elongated body of the second stay disposed on a second side of the first reference plane, the elongated body of the second stay having sufficient resiliency to substantially return to an original position of the elongated body of the second stay after deflecting the second end of the second stay against the single hook, the first stay and the second stay are symmetrical relative to the first reference plane, wherein the first stay and the second stay are sufficiently rigid to support the first reference plane of the single hook assembly in a substantially vertical orientation when the first and second stays are placed on a horizontal surface with the point disposed over the shank of the single hook, and wherein the second ends of the first and second stays do not extend past a barb of the single hook when deflected against the single hook.

14. The replaceable single hook assembly of claim 13, wherein the first and second stays are fabricated from a polymer, each of the first and second stays having a sectional area greater than or equal to a sectional area of the shank.

15. A hollow body fishing lure hook replacement kit comprising:
a packaging container; and
the replaceable single hook assembly of claim 13 disposed in the packaging container.

16. The hollow body fishing lure hook replacement kit of claim 15 further comprising:
an adhesive backed weed guard disposed in the container, the adhesive backed weed guard comprising:
a pad;
a plurality of projections extending a distance from a first side of the pad, the distance being at least half a diameter of the shank and less than 2.5 times the diameter of the shank;
an adhesive disposed on a second side of the pad; and
a peel-away backing disposed over the adhesive.

17. The hollow body fishing lure hook replacement kit of claim 16, wherein each of the plurality of projections of the adhesive backed weed guard further comprises:
a proximal end coupled to a distal end by an elongated shaft, the proximal end coupled to the pad, the distal end having a cap that overhangs the shaft.

18. The hollow body fishing lure hook replacement kit of claim 17, wherein the cap has a sectional area greater than a sectional area of the shaft of the projection.

19. A replaceable single hook assembly for replacing a hook in a hollow body fishing lure, the replaceable single hook assembly consisting essentially of:
a single hook having a shank terminating at an eye, a bend connecting the shank to a point, the bend and the shank both residing in a first reference plane;
a spacer having a first eye and a second eye connected by a link, the first eye connected to the eye of the hook
a first stay having an elongated body, the elongated body having a first end connected to the single hook and a second end extending away from the shank towards the bend of the single hook, the elongated body disposed on a first side of the first reference plane; and
a second stay having an elongated body, the elongated body of the second stay having a first end connected to the single hook and a second end extending away from the shank towards the bend of the single hook, the elongated body of the second stay disposed on a second side of the first reference plane, wherein the first stay and the second stay form an arrow shape.

20. The replaceable single hook assembly of claim 19, wherein:
the first stay and the second stay have an orientation perpendicular to the first reference plane of the single hook assembly, and are sufficiently rigid to support the first reference plane of the single hook assembly in a substantially vertical orientation when the first and second stays are placed on a horizontal surface with the point disposed over the shank of the single hook.

21. The replaceable single hook assembly of claim 20, wherein the second ends of the first and second stays do not extend beyond a total length of the single hook when deflected against the single hook.

* * * * *